3,352,899
SUBSTITUTED BENZOHYDROXAMATES
Kanji Taniguchi, Fujisawa-shi, Mitsuo Asada, Oiso-machi, Naka-gun, and Reiji Sakimoto, Takaoka-shi, Japan, assignors to Nippon Soda Kabushiki Kaisha, Tokyo-to, Japan, a company of Japan
No Drawing. Filed June 4, 1965, Ser. No. 461,541
6 Claims. (Cl. 260—453)

ABSTRACT OF THE DISCLOSURE

Acaricides having high activity against adults and eggs of mites, said compounds having the general formula

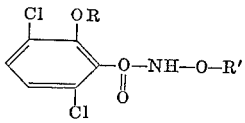

wherein R represents methyl or ethyl and R' represents methyl, ethyl, propyl, allyl or —CH$_2$—C≡CH.

---

It is known that mites are one of the most harmful pests of various crops and orchard trees and resistance problems in mite control are now becoming serious for most of the commercial acaricides. With the increase of these resistant mites, it is desired to disclose and develop acaracidal compounds for mite control.

We have now found the novel compounds particularly valuable as acaricides and adapted to be used as active ingredients of acaricidal compositions for the control of mites including resistant species and populations.

The novel compounds which are provided by this invention are 3,6-dichloro-2-alkoxybenzohydroxamates of the formula

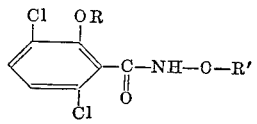

wherein R represents a lower alkyl radical, particularly CH$_3$ and C$_2$H$_5$ and R' represents methyl, ethyl, propyl, allyl or propargyl.

It is among the advantages of the invention that the compounds of the invention have sufficient low phytotoxicity to use without any injury on living plants and extremely low mammalian toxicity.

The novel compounds 3,6-dichloro-2-alkoxybenzohydroxamates may be prepared by several methods. In a convenient method the compounds are prepared through the reaction of 3,6-dichloro-2-alkoxybenzohydroxamic acid with reagents such as dialkyl sulfate, alkyl halides, alkenyl halides and alkynyl halides. This reaction is carried out in alcoholic aqueous solution in the presence of a dehydrochlorination agent such as alkali metal hydroxide and alkali metal carbonate. In an alternative method, the compounds may be obtained by reacting alkyl 3,6-dichloro-2-alkoxybenzoate with O-substituted hydroxylamines such as O-alkylhydroxylamines, O-alkenylhydroxylamines and O-alkynylhydroxylamines. This reaction is carried out in alcoholic solution in the presence of an equimolecular quantity of alkali metal alkoxide. In a further alternative method, the compounds may also be prepared by reacting 3,6-dichloro-2-alkoxybenzoyl chloride with O-substituted hydroxylamines such as O-alkylhydroxylamines, O-alkenylhydroxylamines and O-alkynylhydroxylamines. This reaction is carried out in an organic solvent in the presence of a dehydrochlorination agent such as tertiary amines and alkali metal carbonate.

The following examples, which more fully describe the invention, are illustrations, but not a limitation thereof.

Example I

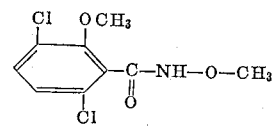

A solution of 21.4 g. of 3,6-dichloro-2-methoxybenzoyl chloride in 100 ml. of chloroform was added dropwise with vigorous stirring into a mixture consisting of 9.4 g. of O-methylhydroxylamine hydrochloride, 33.1 g. of potassium carbonate, 150 ml. of water and 75 ml. of chloroform. The mixture was stirred at room temperature for further 5 hours, after which the layers were separated. The chloroform layer was washed with 50 ml. of diluted hydrochloric acid aqueous solution, and washed with 50 ml. of saturated aqueous solution of sodium bicarbonate after water washing, and then washed with more water. The washed chloroform solution was dried over magnesium sulfate, and then concentrated in vacuo. The residue gave 13.4 g. of the desired compound as white crystals, M.P. 117–118° C., when recrystallized from benzene.

Example II

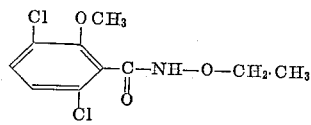

About 40 ml. of an aqueous solution of 2.9 g. of potassium hydroxide and 0.5 g. of sodium carbonate was added to a cooled solution of 11.8 g. of 2,6-dichloro-2-methoxybenzohydroxamic acid and 7.8 g. of diethyl sulfate in 80 ml. of methanol at a temperature of 15–17° C., with vigorous stirring, over a period of 5 minutes. The reaction mixture was stirred for additional 7 hours at a temperature of 20–30° C. The resulting mixture was concentrated in vacuo, and the residue was acidified with 1 ml. of conc-HCl and extracted with 100 ml. of chloroform. The chloroform layer was washed with 50 ml. of saturated aqueous solution of sodium bicarbonate, washed with water, and dried over magnesium sulfate. The dried chloroform solution was concentrated in vacuo. The residue gave 12 g. of the desired compound as white crystals, M.P. 123.0–124.5° C., after recrystallization from benzene.

Example III

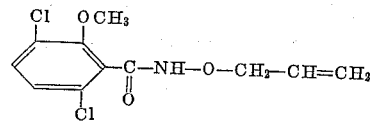

To a cooled solution of 11.8 g. of 3,6-dichloro-2-methoxybenzohydroxamic acid and 6.7 g. of allyl bromide in 80 ml. of methanol was added 40 ml. of an aqueous solution containing 2.9 g. of potassium hydroxide and 0.5 g. of sodium carbonate at a temperature of 19–27° C., with vigorous stirring, over a period of 10 minutes. About 10.9 g. of the desired compound was obtained as white crystals with M.P. 93.5–94.5° C. in the manner described in Example II.

A number of compounds of the present invention is listed in Table I, but the objectives of this invention are not limited only to these compounds.

TABLE I

| No. of Compound | Chemical Formula | Appearance | M.P. (° C.) |
|---|---|---|---|
| I | 2,6-Cl, 4-OCH$_3$-C$_6$H$_2$-C(=O)-NH-O-CH$_3$ | White needles | 117–118 |
| II | 2,6-Cl, 4-OCH$_3$-C$_6$H$_2$-C(=O)-NH-O-CH$_2$.CH$_3$ | White needles | 123–124.5 |
| III | 2,6-Cl, 4-OCH$_3$-C$_6$H$_2$-C(=O)-NH-O-CH$_2$.CH$_2$.CH$_3$ | White needles | 102–103 |
| IV | 2,6-Cl, 4-OCH$_3$-C$_6$H$_2$-C(=O)-NH-O-CH$_2$-CH=CH$_2$ | White needles | 93.5–94.5 |
| V | 2,6-Cl, 4-OCH$_3$-C$_6$H$_2$-C(=O)-NH-O-CH$_2$C≡CH | White needles | 117–118 |
| VI | 2,6-Cl, 4-OC$_2$H$_5$-C$_6$H$_2$-C(=O)-NH-O-CH$_2$-CH=CH$_2$ | White needles | 121–122 |

The acaricidal compositions made on the basis of the present invention include one or more of the aforesaid compounds and other pesticides, and are formulated in emulsifiable concentrates, dusts, wettable powders and aerosols.

Example IV

The following composition is formulated as an emulsifiable concentrate by dissolving the active ingredient in a solvent together with a surface-active agent.

|   | Parts |
|---|---|
| Compound I | 20 |
| Alkylarylpolyoxyethylene | 5 |
| Xylene | 75 |

This composition is diluted with water to give an aqueous emulsion suitable for use in accordance with the invention.

Example V

A wettable powder having the following composition can be prepared by grinding together a mixture of the active ingredient, an inert diluent, a surface active agent and dispersing agent.

|   | Parts |
|---|---|
| Compound II | 20 |
| Higher alcohol sulfonate | 5 |
| Diatomaceous earth | 75 |

This composition is diluted with water to give an aqueous dispersion suitable for use in accordance with the invention.

Example VI

The following dust formulation can be prepared by blending of the active ingredients and inert diluent and then grinding the mixture to a homogeneous powder.

|   | Parts |
|---|---|
| Compound III | 2.5 |
| 1,1-bis(4-chlorophenyl)ethanol | 2.5 |
| Alkyl aryl polyoxyethylene | 0.1 |
| Talc | 94.9 |

This composition is applied as a dust suitable for use in accordance with the invention.

Example VII

Acaricidal activity, phytotoxicity and mammalian toxicity of the novel compounds of this invention are shown in Table II as following test results.

*Activity to adults.*—Adult females of the citrus red mite (*Panonychus citri*) were reared on mandarin orange leaves put into petri dishes. Then, on the leaves, the aqueous suspensions of wettable powders formulated in accordance with Example V were sprayed respectively. Mortalities were counted after three days.

*Activity to eggs.*—Mandarin orange leaves, on which eggs of citrus red mite (*Panonychus citri*) were laid, were put into petri dishes. Then, the water suspensions were sprayed according to the above test method. Ovicidal activities were observed after eight days.

TABLE II

| No. of Compound | Dosage, Percent | Acaricidal Activity Mortality (Percent) | | Phytotoxicity against Kidney bean | Acute oral toxicity for mice, LD$_{50}$ (mg./kg.) |
| --- | --- | --- | --- | --- | --- |
| | | Adult | Egg | | |
| I | 0.025 | 100 | 100 | None | 1,500 |
|   | 0.006 | 97  | 80  | None |       |
| II | 0.025 | 100 | 100 | None | 1,600 |
|    | 0.006 | 100 | 85  | None |       |
| III | 0.025 | 100 | 100 | None | 2,000 |
|     | 0.006 | 97  | 92  | None |       |
| IV | 0.025 | 100 | 100 | None | 2,000 |
|    | 0.006 | 100 | 96  | None |       |
| V | 0.025 | 100 | 100 | None | 1,500 |
|   | 0.006 | 96  | 82  | None |       |
| Untreated | | 6 | 3 | None | |

What we claim is:

1. A compound having the general formula

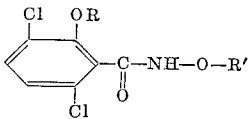

wherein R represents methyl or ethyl and R' represents methyl, ethyl, propyl, allyl, or —CH$_2$—C≡CH.

2. A compound of the formula

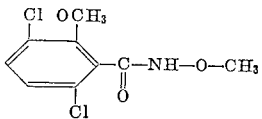

3. A compound of the formula

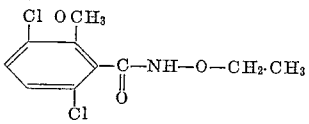

4. A compound of the formula

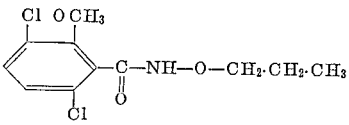

5. A compound of the formula

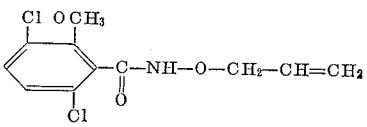

6. A compound of the formula

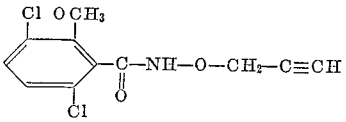

References Cited

UNITED STATES PATENTS 3,190,800   6/1965   Furst _____ 260—453 XR
3,236,871   2/1966   Hinman et al. _____ 260—453

JOSEPH P. BRUST, *Primary Examiner.*